United States Patent
Sato (10) Patent No.: US 12,123,891 B2
(45) Date of Patent: Oct. 22, 2024

(54) PHYSICAL QUANTITY SENSOR, PHYSICAL QUANTITY SENSOR DEVICE, AND METHOD FOR MANUFACTURING PHYSICAL QUANTITY SENSOR DEVICE

(71) Applicant: SEIKO EPSON CORPORATION, Tokyo (JP)

(72) Inventor: Kenta Sato, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/873,799

(22) Filed: Jul. 26, 2022

(65) Prior Publication Data

US 2023/0032633 A1 Feb. 2, 2023

(51) Int. Cl.
| | | |
|---|---|---|
| *G01P 15/08* | (2006.01) | |
| *G01L 1/10* | (2006.01) | |
| *G01P 1/02* | (2006.01) | |
| *G01P 15/097* | (2006.01) | |
| *G01P 15/135* | (2006.01) | |
| *G01P 15/18* | (2013.01) | |

(52) U.S. Cl.
CPC .......... *G01P 15/0802* (2013.01); *G01P 1/023* (2013.01); *G01P 15/097* (2013.01); *G01P 15/135* (2013.01); *G01P 15/18* (2013.01); *G01L 1/106* (2013.01)

(58) Field of Classification Search
CPC .... G01P 15/097; G01P 15/0802; G01P 15/18; G01P 15/135; G01P 1/02; G01P 1/023
See application file for complete search history.

(56) References Cited

U.S. PATENT DOCUMENTS

| | | | | |
|---|---|---|---|---|
| 2013/0112019 | A1* | 5/2013 | Watanabe | G01P 15/097 73/865.8 |
| 2016/0079954 | A1* | 3/2016 | Kameta | H03H 9/0509 310/321 |
| 2017/0184626 | A1* | 6/2017 | Kameta | G01P 15/097 |
| 2018/0065840 | A1* | 3/2018 | Oto | G01P 15/123 |
| 2018/0267078 | A1* | 9/2018 | Sato | G01P 15/097 |
| 2019/0257652 | A1* | 8/2019 | Kameta | G01C 19/56 |
| 2019/0261508 | A1* | 8/2019 | Sato | H05K 1/0298 |
| 2019/0277871 | A1* | 9/2019 | Sato | G01P 15/18 |
| 2019/0277873 | A1* | 9/2019 | Sato | G01P 1/023 |
| 2019/0277876 | A1* | 9/2019 | Sato | G01P 15/0802 |
| 2019/0316903 | A1* | 10/2019 | Sato | G01C 9/06 |
| 2019/0320526 | A1* | 10/2019 | Sato | H05K 1/181 |

FOREIGN PATENT DOCUMENTS

JP 2019-158475 A 9/2019

* cited by examiner

*Primary Examiner* — Helen C Kwok
(74) *Attorney, Agent, or Firm* — Rankin, Hill & Clark LLP (57) ABSTRACT

A physical quantity sensor includes: a base portion; a first arm portion, a second arm portion, and a third arm portion that are coupled to the base portion and that are provided with fixing portions; a movable portion disposed between the first arm portion and the second arm portion and between the first arm portion and the third arm portion in a plan view; a constricted portion that is disposed between the base portion and the movable portion, and that couples the base portion and the movable portion; and a physical quantity detection element that is disposed across the constricted portion in the plan view and that is attached to the base portion and the movable portion. Thin portions are formed at least at two positions in at least one of the second arm portion and the third arm portion.

4 Claims, 11 Drawing Sheets

PHYSICAL QUANTITY SENSOR, PHYSICAL QUANTITY SENSOR DEVICE, AND METHOD FOR MANUFACTURING PHYSICAL QUANTITY SENSOR DEVICE

The present application is based on, and claims priority from JP Application Serial Number 2021-123141, filed Jul. 28, 2021, the disclosure of which is hereby incorporated by reference herein in its entirety.

BACKGROUND

1. Technical Field

The present disclosure relates to a physical quantity sensor, a physical quantity sensor device, and a method for manufacturing a physical quantity sensor device.

2. Related Art

For example, JP-A-2019-158475 discloses a physical quantity sensor including a base portion, three arm portions, a movable portion, a constricted portion, and a physical quantity detection element. In the physical quantity sensor, fixed regions provided in the three arm portions are formed in a first region and a second region that are defined by a first straight line passing through a center of the physical quantity detection element along a direction crossing the constricted portion in a plan view, and are not formed in, among four regions defined by the first straight line and a second straight line passing through the constricted portion and orthogonal to the first straight line in the plan view, at least one of a third region located in the first region closer to a base portion than is the second straight line and a fourth region located in the second region closer to the base portion than is the second straight line.

However, in the physical quantity sensor described in JP-A-2019-158475, when the fixed region is fixed to a package or the like by an adhesive or the like, a stress at the time of fixing, an external force applied to the package, a stress caused by a difference in thermal expansion, and the like may be transmitted to the physical quantity detection element via the fixed region, and temperature characteristics and aging characteristics of the physical quantity sensor may deteriorate.

SUMMARY

A physical quantity sensor includes: a base portion; a first arm portion, a second arm portion, and a third arm portion that are coupled to the base portion and that are provided with fixing portions; a movable portion disposed between the first arm portion and the second arm portion and between the first arm portion and the third arm portion in a plan view; a constricted portion that is disposed between the base portion and the movable portion, and that couples the base portion and the movable portion; and a physical quantity detection element that is disposed across the constricted portion in the plan view and that is attached to the base portion and the movable portion. Thin portions are formed at least at two positions in at least one of the second arm portion and the third arm portion.

A physical quantity sensor device includes: the physical quantity sensor including the fixing portion described above; and a base at which the physical quantity sensor is mounted. The fixing portion is attached to the base.

A method for manufacturing a physical quantity sensor device includes: preparing a physical quantity detection element; preparing a cantilever including a base portion, a first fixing portion, a second fixing portion, and a third fixing portion; bonding the physical quantity detection element to the cantilever; attaching the first fixing portion, the second fixing portion, and the third fixing portion to a base; and separating the second fixing portion and the base portion from each other or separating the third fixing portion and the base portion from each other.

DESCRIPTION OF EXEMPLARY EMBODIMENTS

1. First Embodiment

1.1. Physical Quantity Sensor

First, a physical quantity sensor 10 according to a first embodiment is described with reference to FIGS. 1, 2 and 3 by taking an acceleration sensor that detects an acceleration in a vertical direction as an example.

For convenience of description, an X axis, a Y axis, and a Z axis are shown as three axes orthogonal to one another in the following perspective views, plan views and a cross-sectional view. A direction along the X axis is referred to as an "X direction", a direction along the Y axis is referred to as a "Y direction", and a direction along the Z axis is referred to as a "Z direction". An arrow side in each axis is also referred to as a "plus side", and an opposite side from the arrow is also referred to as a "minus side". A plus side in the Z direction is also referred to as "upper", and a minus side in the Z direction is also referred to as "lower". The Z direction is along the vertical direction, and an XY plane is along a horizontal plane. In the present specification, a plus Z direction and a minus Z direction are collectively referred to as the Z direction.

The physical quantity sensor 10 according to the present embodiment can detect an acceleration of a physical quantity detection element 60 in the Z direction, which is the vertical direction, as a physical quantity. As shown in FIG. 1, such a physical quantity sensor 10 includes the physical quantity detection element 60, a cantilever 15 that fixes the physical quantity detection element 60, and a mass portion 70 serving as a weight.

Figure 2:
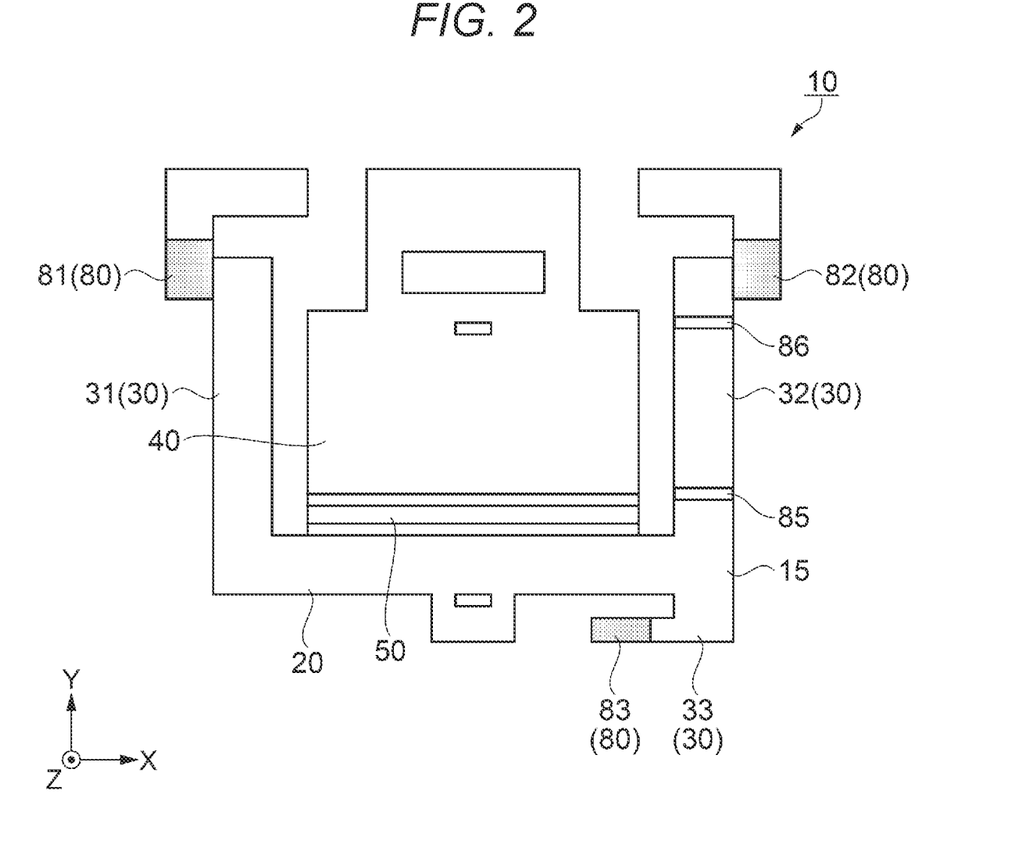
FIG. 2 is a plan view showing a schematic structure of a cantilever provided in the physical quantity sensor according to the first embodiment.
Figure 3:
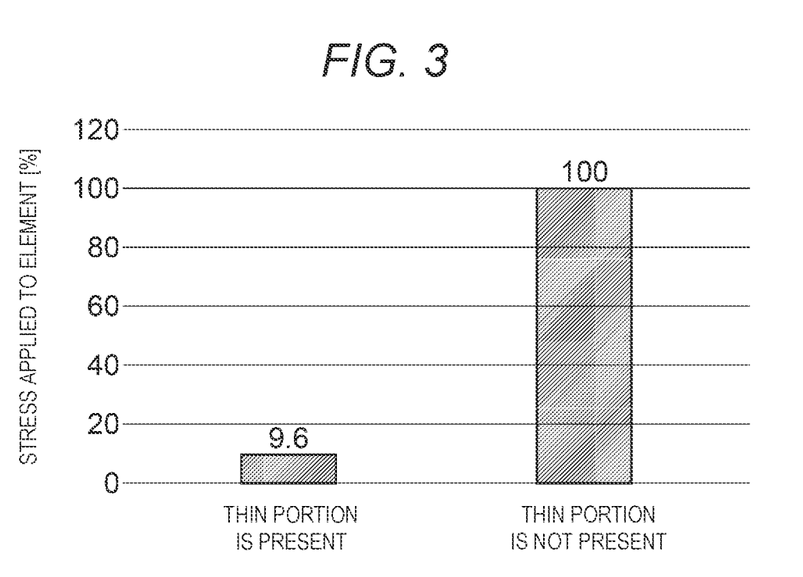
FIG. 3 is a diagram showing a difference in stress applied to an element depending on the presence or absence of a thin portion.

The cantilever 15 is formed of a crystal substrate, and includes, as shown in FIG. 2, a base portion 20, an arm portion 30, a movable portion 40, and a constricted portion 50.

A first arm portion 31, a second arm portion 32, and a third arm portion 33, which are arm portions 30, are coupled to both ends of the base portion 20 in the X direction. The first arm portion 31 extending to a positive side in the Y direction is coupled to one end portion of the base portion 20, and the second arm portion 32 extending to the positive side in the Y direction and the third arm portion 33 extending to the negative side in the Y direction are coupled to the other end portion of the base portion 20.

The first arm portion 31, the second arm portion 32, and the third arm portion 33 include base end portions coupled to the base portion 20, and a first fixing portion 81, a second fixing portion 82, and a third fixing portion 83, which are fixing portions 80, are respectively provided on a free end portion sides of the first arm portion 31, the second arm portion 32, and the third arm portion 33. In the second arm portion 32, thin portions 85 and 86 are formed at two positions between the base portion 20 and the second fixing portion 82. The thin portions 85 and 86 are thinner than the other portions in the Z direction, which is a thickness direction of the second arm portion 32. In the present embodiment, although the thin portions 85 and 86 are provided at the two positions between the base portion 20 of the second arm portion 32 and the second fixing portion 82, the present disclosure is not limited thereto. Alternatively, the thin portions may be provided at three or more positions.

The movable portion 40 is disposed between the first arm portion 31 and the second arm portion 32 and between the first arm portion 31 and the third arm portion 33 in a plan view from the Z direction.

The constricted portion 50 is disposed between the base portion 20 and the movable portion 40, and couples the base portion 20 and the movable portion 40.

The physical quantity detection element 60 is implemented by, for example, a double-tuning fork type crystal resonator, and detects, for example, an acceleration or pressure as a physical quantity. The physical quantity detection element 60 is disposed across the constricted portion 50 in a plan view from the Z direction, and is attached to the base portion 20 and the movable portion 40 via a bonding member 61 (see FIG. 6) such as an adhesive.

Figure 1:
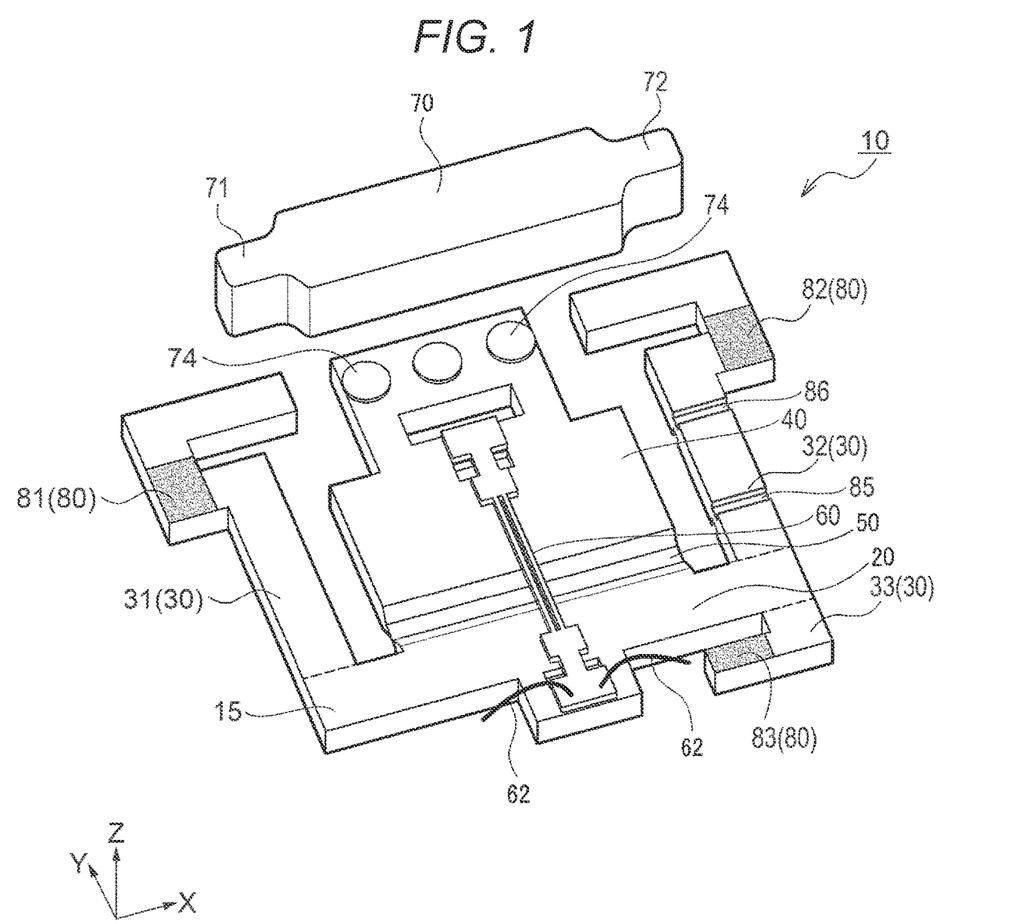
FIG. 1 is a perspective view showing a schematic structure of a physical quantity sensor according to a first embodiment.

The mass portion 70 is made of metal such as SUS or copper, for example, and is bonded to an upper surface of the movable portion 40 on a free end portion side via a bonding member 74, as shown in FIG. 1. The mass portion 70 is not limited to being bonded to an upper surface side of the movable portion 40, and may also be bonded to a lower surface side of the movable portion 40 (see FIG. 6). The mass portion 70 moves up and down together with the movable portion 40, and both end portions 71 and 72 of the mass portion 70 function as stoppers that prevent excessive amplitude by coming into contact with the first arm portion 31 and the second arm portion 32.

Here, when the movable portion 40 is displaced according to a physical quantity such as an acceleration or pressure with the constricted portion 50 as a fulcrum, a stress is generated in the physical quantity detection element 60 attached to the base portion 20 and the movable portion 40. A resonance frequency serving as a vibration frequency of the physical quantity detection element 60 changes according to the stress applied to the physical quantity detection element 60. The physical quantity can be detected based on the change in the resonance frequency.

Next, effects of the thin portions 85 and 86 formed in the second arm portion 32 will be described.

When the fixing portion 80 of the physical quantity sensor 10 is fixed to a package or the like via an adhesive or the like, a stress at the time of fixing, an external force applied to the package, a stress due to a difference in thermal expansion between the cantilever 15 and the package accompanying a change in external temperature, and the like may be transmitted to the physical quantity detection element 60 via the fixing portion 80, and the temperature characteristics and the aging characteristics of the physical quantity sensor 10 may deteriorate.

Therefore, in the physical quantity sensor 10 according to the present embodiment, the thin portions 85 and 86 are formed in the second arm portion 32 in order to reduce the influence of the stress from the package or the like. FIG. 3 is a diagram showing a stress applied to the physical quantity detection element 60 when the thin portions 85 and 86 are formed in the second arm portion 32 and when the thin portions 85 and 86 are not formed in the second arm portion 32. Assuming that a case in which the thin portions 85 and 86 are not provided is 100% of a reference, a case in which the thin portions 85 and 86 are provided is 9.6%, and the stress applied to the physical quantity detection element 60 can be reduced by about 90% as compared with the case in which the thin portions 85 and 86 are not provided. Therefore, by forming the thin portions 85 and 86 in the second arm portion 32, it is possible to reduce deterioration of the temperature characteristics and the aging characteristics when the physical quantity sensor 10 is fixed to a package or the like.

As described above, in the physical quantity sensor 10 according to the present embodiment, the thin portions 85 and 86, which are thinner than the other portions, are formed at the two positions between the base portion 20 of the second arm portion 32 and the second fixing portion 82, a stress from a package or the like when the fixing portion 80 is fixed can be relaxed, and deterioration of the temperature characteristics and the aging characteristics can be reduced. Therefore, it is possible to obtain the physical quantity sensor 10 excellent in temperature characteristics and aging characteristics.

2. Second Embodiment

Next, a physical quantity sensor 10a according to a second embodiment will be described with reference to FIG. 4.

Figure 4:
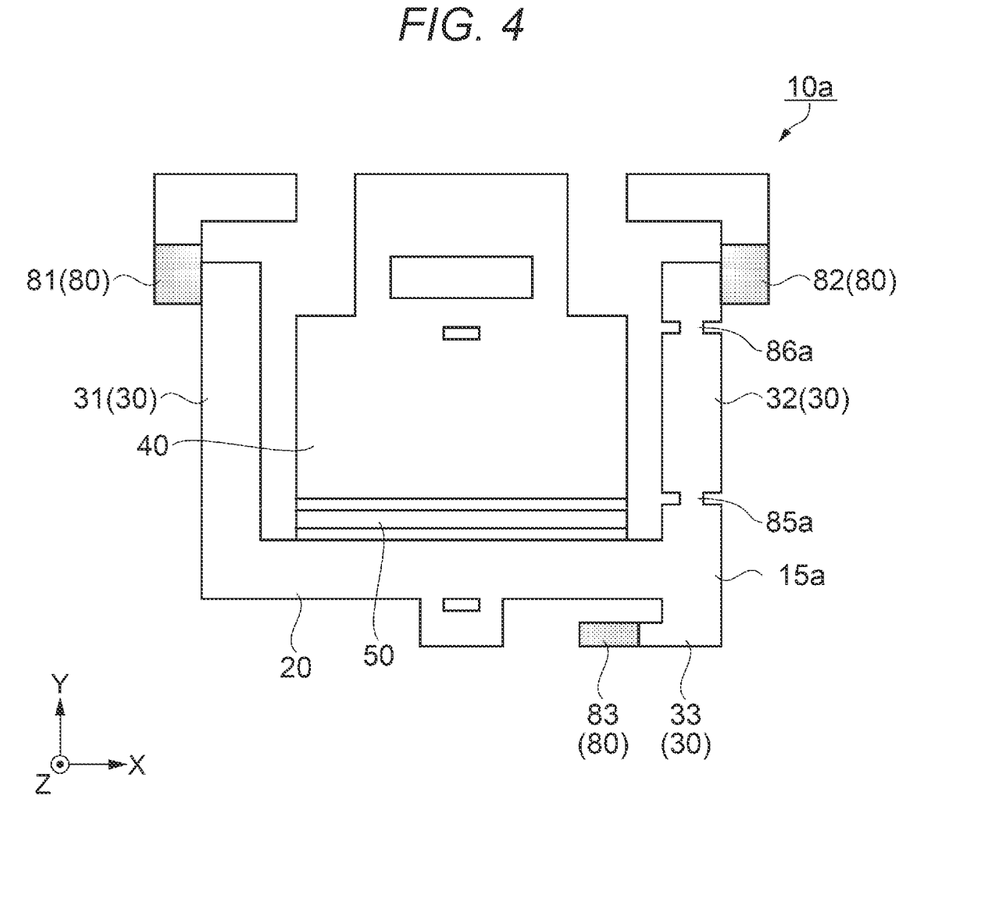
FIG. 4 is a plan view showing a schematic structure of a cantilever provided in the physical quantity sensor according to a second embodiment.

FIG. 4 is a plan view showing a schematic structure of a cantilever 15a in the physical quantity sensor 10a according to the second embodiment.

The physical quantity sensor 10a according to the present embodiment is similar as the physical quantity sensor 10 according to the first embodiment except that the structure of the cantilever 15a is different from that of the physical quantity sensor 10 according to the first embodiment. Differences from the first embodiment described above will be mainly described, the same elements will be denoted by the same reference numerals, and the description thereof will be omitted.

As shown in FIG. 4, in the cantilever 15a of the physical quantity sensor 10a, thin portions 85a and 86a are formed at two positions between the base portion 20 of the second arm portion 32 and the second fixing portion 82. The thin portions 85a and 86a are thinner than the other portions in the X direction, which is a thickness direction of the second arm portion 32. In the present embodiment, although the thin portions 85a and 86a are provided at the two positions between the base portion 20 of the second arm portion 32 and the second fixing portion 82, the present disclosure is not limited thereto. Alternatively, the thin portions may be provided at three or more positions.

With such a configuration, it is possible to attain similar effects as those of the physical quantity sensor 10 according to the first embodiment.

Since the width dimension of the thin portions 85a and 86a can be processed with high accuracy according to the photolithography technique and the etching technique, variations in temperature characteristics and aging characteristics can be reduced.

3. Third Embodiment

Next, a physical quantity sensor 10b according to a third embodiment will be described with reference to FIG. 5.

Figure 5:
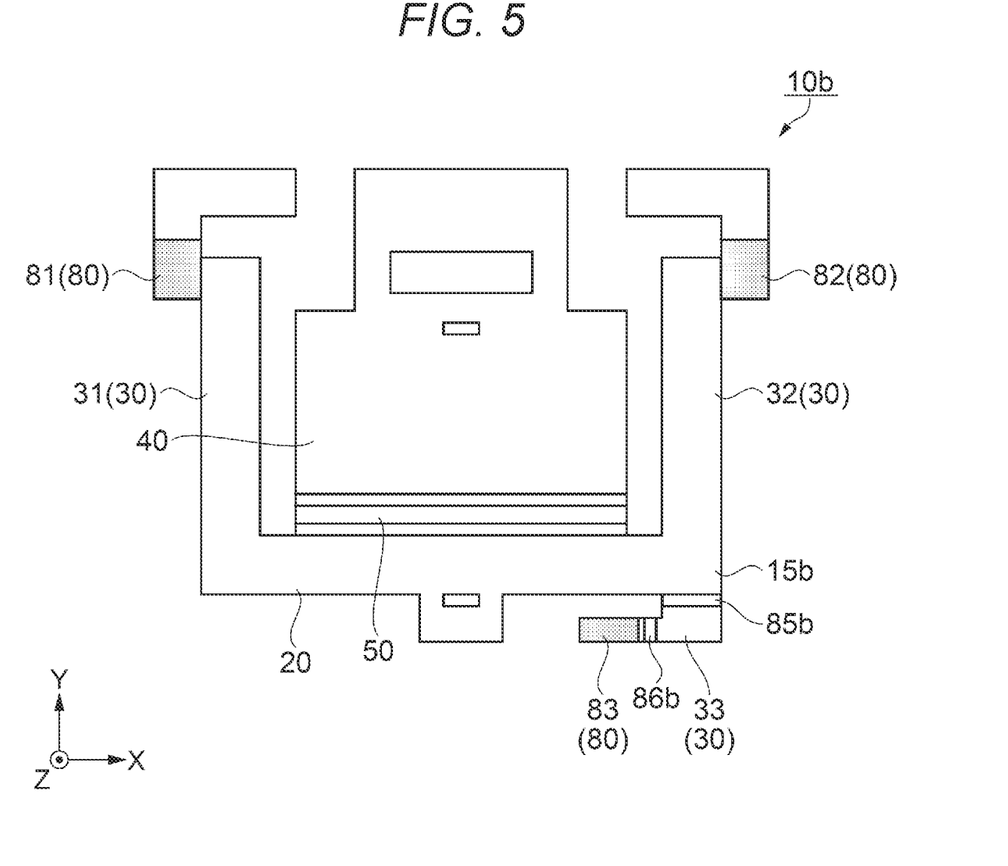
FIG. 5 is a plan view showing a schematic structure of a cantilever provided in the physical quantity sensor according to a third embodiment.

FIG. 5 is a plan view showing a schematic structure of a cantilever 15b in the physical quantity sensor 10b according to the third embodiment.

The physical quantity sensor 10b according to the present embodiment is similar as the physical quantity sensor 10 according to the first embodiment except that the structure of the cantilever 15b is different from that of the physical quantity sensor 10 according to the first embodiment. Differences from the first embodiment described above will be mainly described, the same elements will be denoted by the same reference numerals, and the description thereof will be omitted.

As shown in FIG. 5, in the physical quantity sensor 10b, thin portions 85b and 86b are formed at two positions between the base portion 20 of the third arm portion 33 and the third fixing portion 83. The thin portions 85b and 86b are thinner than the other portions in the Z direction, which is a thickness direction of the third arm portion 33. In the present embodiment, although the thin portions 85b and 86b are provided at the two positions between the base portion 20 of the third arm portion 33 and the third fixing portion 83, the present disclosure is not limited thereto. Alternatively, the thin portions may be provided at three or more positions.

With such a configuration, it is possible to attain similar effects as those of the physical quantity sensor 10 according to the first embodiment.

4. Fourth Embodiment

4.1. Physical Quantity Sensor Device

Figure 6:
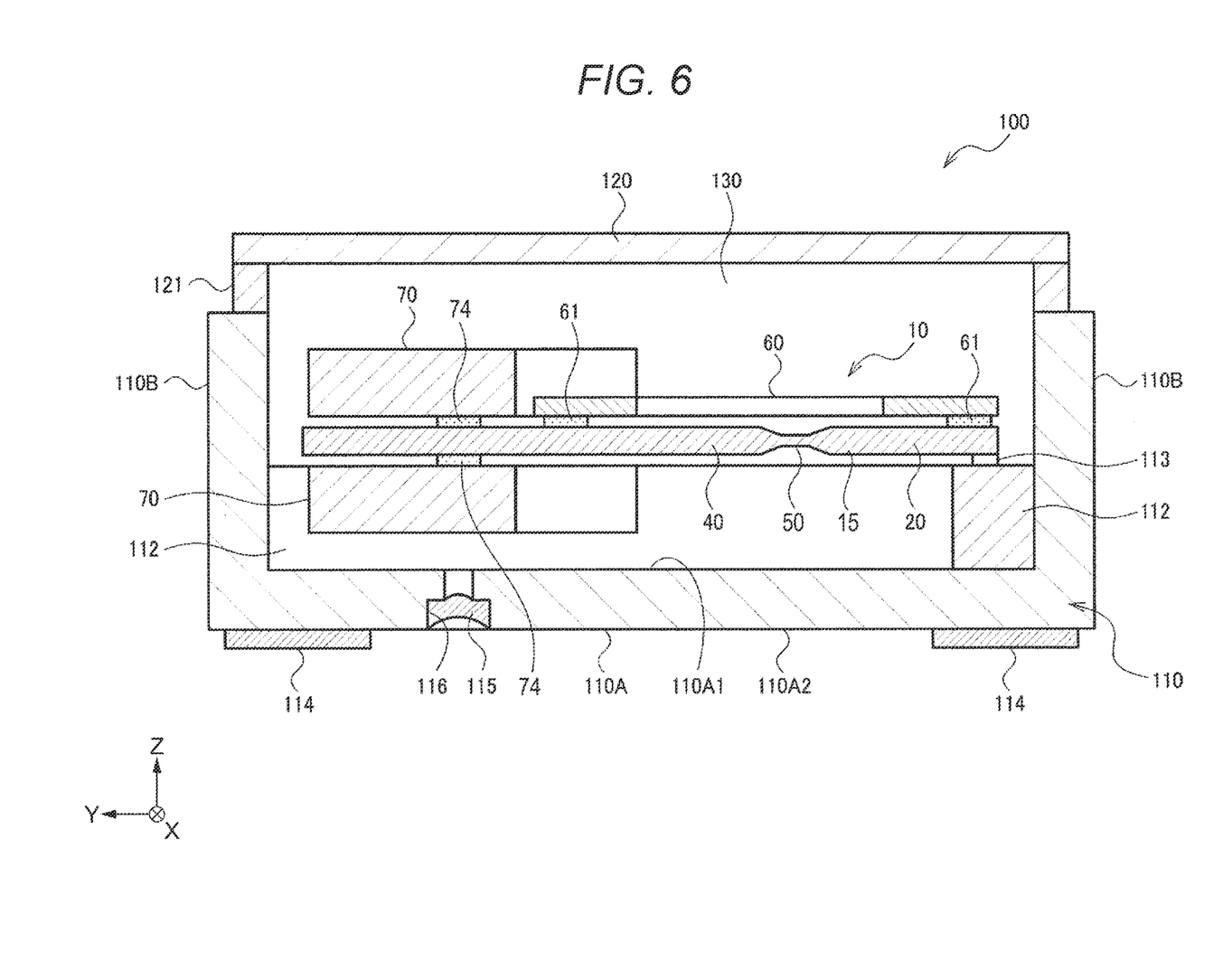
FIG. 6 is a cross-sectional view showing a schematic structure of a physical quantity sensor device according to a fourth embodiment.

Next, a physical quantity sensor device 100 including the physical quantity sensors 10, 10a, and 10b according to a fourth embodiment will be described with reference to FIG. 6. In the following description, a configuration to which the physical quantity sensor 10 is applied will be described as an example.

The physical quantity sensor device 100 includes the physical quantity sensor 10, a base 110 at which the physical quantity sensor 10 is mounted, and a lid 120 serving as a cover. In the present embodiment, the base 110 is configured as a package base including a bottom wall 110A and a side wall 110B. The base 110 forms a package that houses the physical quantity sensor 10 together with the lid 120. The lid 120 is bonded to an opening end of the base 110 via a bonding member 121 such as a glass frit or a seam ring. A physical quantity in the physical quantity sensor device 100 according to the present embodiment is an acceleration.

The bottom wall 110A of the base 110 is provided with a step portion 112 that is one step higher than an inner surface 110A1 of the bottom wall 110A along, for example, the three side walls 110B of the four side walls 110B. The step portion 112 may protrude from the inner surface of the side wall 110B, may be integrated with or separate from the base 110, and is a part of the base 110. As shown in FIG. 6, the physical quantity sensor 10 is fixed to the step portion 112 with an adhesive 113. Specifically, the fixing portion 80 of the physical quantity sensor 10 is attached to the step portion 112 of the base 110. Here, as the adhesive 113, for example, a resin adhesive having a high elastic modulus such as an epoxy resin is preferably used. This is because an adhesive such as low-melting glass is hard and thus cannot absorb stress strain generated at the time of bonding, which adversely affects the physical quantity detection element 60.

In the present embodiment, as shown in FIG. 1, the physical quantity detection element 60 can be coupled to an electrode such as a gold electrode formed on the step portion 112 by a bonding wire 62. In this case, it is not necessary to form an electrode pattern on the base portion 20. However, the electrode pattern provided at the base portion 20 may be coupled to the electrode formed at the step portion 112 of the base 110 via a conductive adhesive without using the bonding wire 62.

The bottom wall 110A of the base 110 is provided with external terminals 114, which are used when the base 110 is mounted at a circuit board or the like (not shown), at an outer surface 110A2 that is an opposite-side surface from the inner surface 110A1. The external terminal 114 is electrically coupled to the physical quantity detection element 60 via a wiring, an electrode, or the like (not shown).

For example, the bottom wall 110A is provided with a sealing portion 115 that hermetically seals an internal space 130 of the package formed by the base 110 and the lid 120. The sealing portion 115 is provided in a through hole 116 formed in the base 110. The sealing portion 115 is provided by disposing a sealing material in the through hole 116, heating and melting the sealing material, and then solidifying the sealing material.

As described above, since the physical quantity sensor device 100 according to the present embodiment includes the physical quantity sensor 10 excellent in temperature characteristics and aging characteristics, an acceleration can be detected with high accuracy.

4.2. Method for Manufacturing Physical Quantity Sensor Device

Next, a method for manufacturing the physical quantity sensor device 100 according to the present embodiment will be described with reference to FIG. 7. In the following description, a manufacturing method to which the physical quantity sensor 10 is applied will be described as an example.

Figure 7:
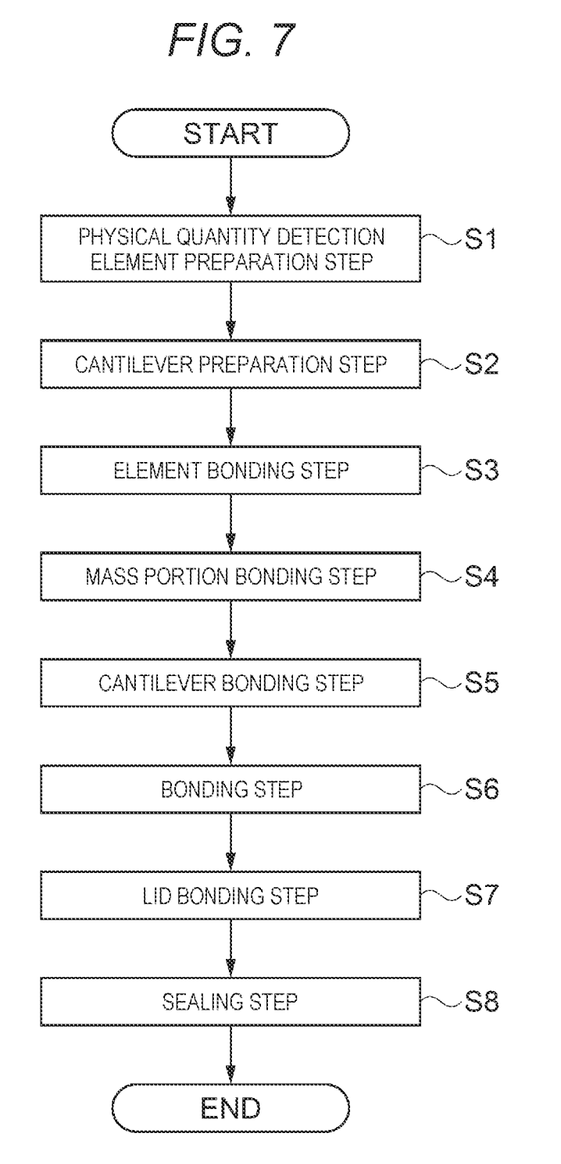
FIG. 7 is a flowchart showing a method for manufacturing a physical quantity sensor device.

As shown in FIG. 7, the manufacturing method for the physical quantity sensor device 100 according to the present embodiment includes a physical quantity detection element preparation step, a cantilever preparation step, an element bonding step, a mass portion bonding step, a cantilever bonding step, a bonding step, a lid bonding step, and a sealing step.

4.2.1. Physical Quantity Detection Element Preparation Step

First, in step S1, a crystal substrate is processed according to a photolithography technique and an etching technique to prepare a double-tuning fork type crystal resonator as the physical quantity detection element 60.

4.2.2. Cantilever Preparation Step

In step S2, the crystal substrate is processed according to the photolithography technique and the etching technique, and the cantilever 15 including the base portion 20, the arm portion 30, the movable portion 40, the constricted portion 50, the thin portions 85 and 86, the first fixing portion 81, the second fixing portion 82, and the third fixing portion 83 is prepared.

4.2.3. Element Bonding Step

In step S3, one end portion of the physical quantity detection element 60 is bonded to the upper surface of the base portion 20 of the cantilever 15 via the bonding member 61 such as an adhesive, and the other end portion of the physical quantity detection element 60 is bonded to the upper surface of the movable portion 40 of the cantilever 15 via the bonding member 61.

4.2.4. Mass Portion Bonding Step

In step S4, the mass portion 70 is bonded to the upper surface and the lower surface on the free end portion side of the movable portion 40 of the cantilever 15 via the bonding member 74.

4.2.5. Cantilever Bonding Step

In step S5, the cantilever 15 in which the physical quantity detection element 60 and the mass portion 70 are bonded is bonded to the base 110. Specifically, the first fixing portion 81, the second fixing portion 82, and the third fixing portion 83 of the physical quantity sensor 10 are fixed onto the step portion 112 of the base 110 via the adhesive 113.

4.2.6. Bonding Step

In step S6, the electrode provided at the physical quantity detection element 60 and the electrode formed at the step portion 112 of the base 110 are electrically coupled by the bonding wire 62.

4.2.7. Lid Bonding Step

In step S7, the lid 120 is bonded to the upper surface of the base 110 via the bonding member 121.

4.2.8 Sealing Step

In step S8, a sealing material is disposed in the through hole 116 formed in the bottom wall 110A of the base 110, the sealing material is heated and melted and then solidified, and the internal space 130 in which the physical quantity sensor 10 is housed is hermetically sealed.

Through the above steps, the physical quantity sensor device 100 that includes the physical quantity sensor 10 excellent in temperature characteristics and aging characteristics and that is capable of detecting an acceleration with high accuracy is completed.

5. Fifth Embodiment

5.1. Physical Quantity Sensor Device

Next, a physical quantity sensor device 100a according to the fifth embodiment will be described with reference to FIG. 8.

Figure 8:
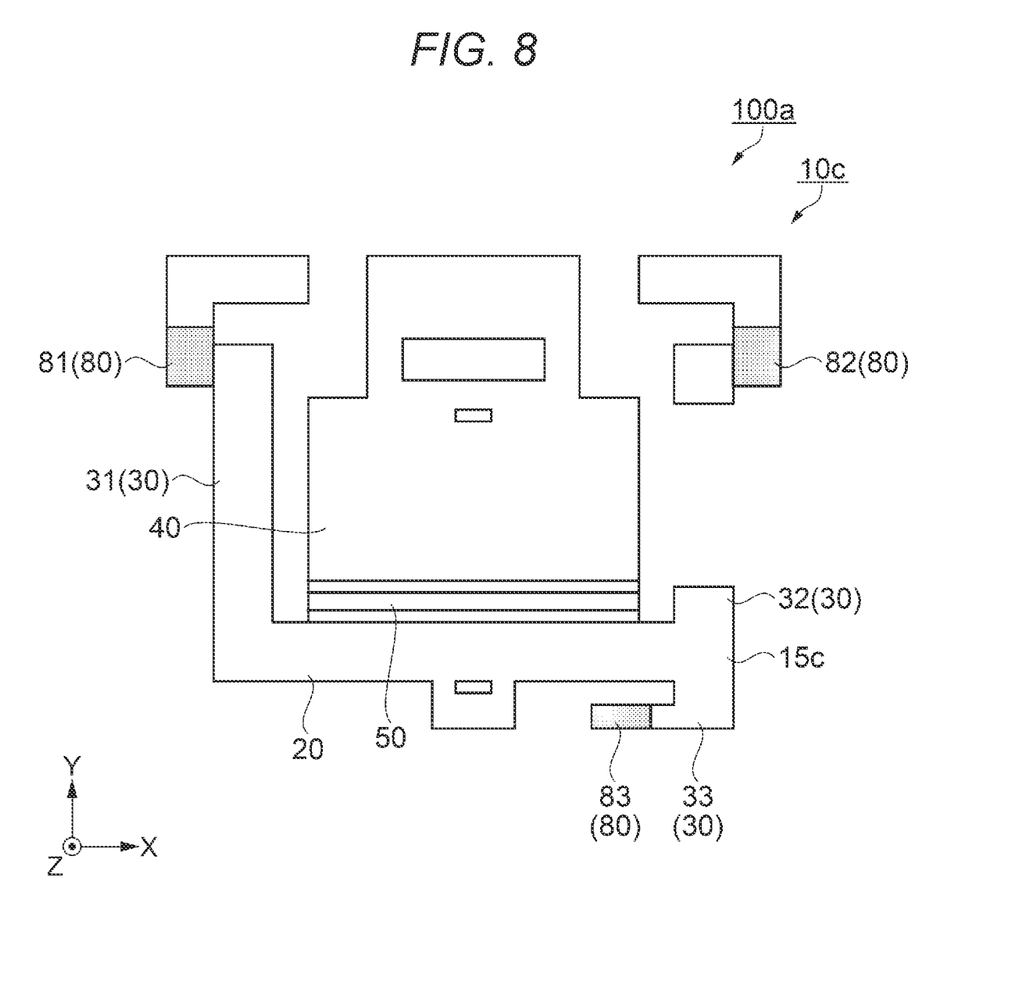
FIG. 8 is a plan view showing a schematic structure of a cantilever provided in a physical quantity sensor device according to a fifth embodiment.

FIG. 8 is a plan view showing a schematic structure of a cantilever 15c of a physical quantity sensor 10c provided in a physical quantity sensor device 100a according to the fifth embodiment.

The physical quantity sensor device 100a according to the present embodiment is similar as the physical quantity sensor device 100 according to the fourth embodiment except that the structure of the cantilever 15c of the physical quantity sensor 10c is different from that of the physical quantity sensor device 100 according to the fourth embodiment. Differences from the fourth embodiment described above will be mainly described, the same elements will be denoted by the same reference numerals, and the description thereof will be omitted.

As shown in FIG. 8, in the cantilever 15c of the physical quantity sensor 10c provided in the physical quantity sensor device 100a, the base portion 20 of the second arm portion 32 and the second fixing portion 82 are separated from each other. This state is a state in which, in the cantilever 15 of the physical quantity sensor 10 according to the first embodiment shown in FIG. 2, a portion between the thin portion 85 and the thin portion 86 formed in the second arm portion 32 is broken and removed. Therefore, the stress from the package or the like generated by fixing the fixing portion 80 can be further relaxed, and the deterioration of the temperature characteristics and the aging characteristics can be further reduced.

With such a configuration, it is possible to attain similar effects as those of the physical quantity sensor device 100 according to the fourth embodiment.

Since the base portion 20 of the second arm portion 32 and the second fixing portion 82 are separated from each other, it is possible to further reduce the deterioration of the temperature characteristics and the aging characteristics.

5.2. Method for Manufacturing Physical Quantity Sensor Device

Next, a method for manufacturing the physical quantity sensor device 100a according to the present embodiment will be described with reference to FIG. 9.

The method for manufacturing the physical quantity sensor device 100a according to the present embodiment is similar as the method for manufacturing the physical quantity sensor device 100 according to the fourth embodiment except that a separating step of step S16 is added after the cantilever bonding step of step S15 as compared to the method for manufacturing the physical quantity sensor device 100 according to the fourth embodiment. Differences from the fourth embodiment described above will be mainly described, the same elements will be denoted by the same reference numerals, and the description thereof will be omitted.

Figure 9:
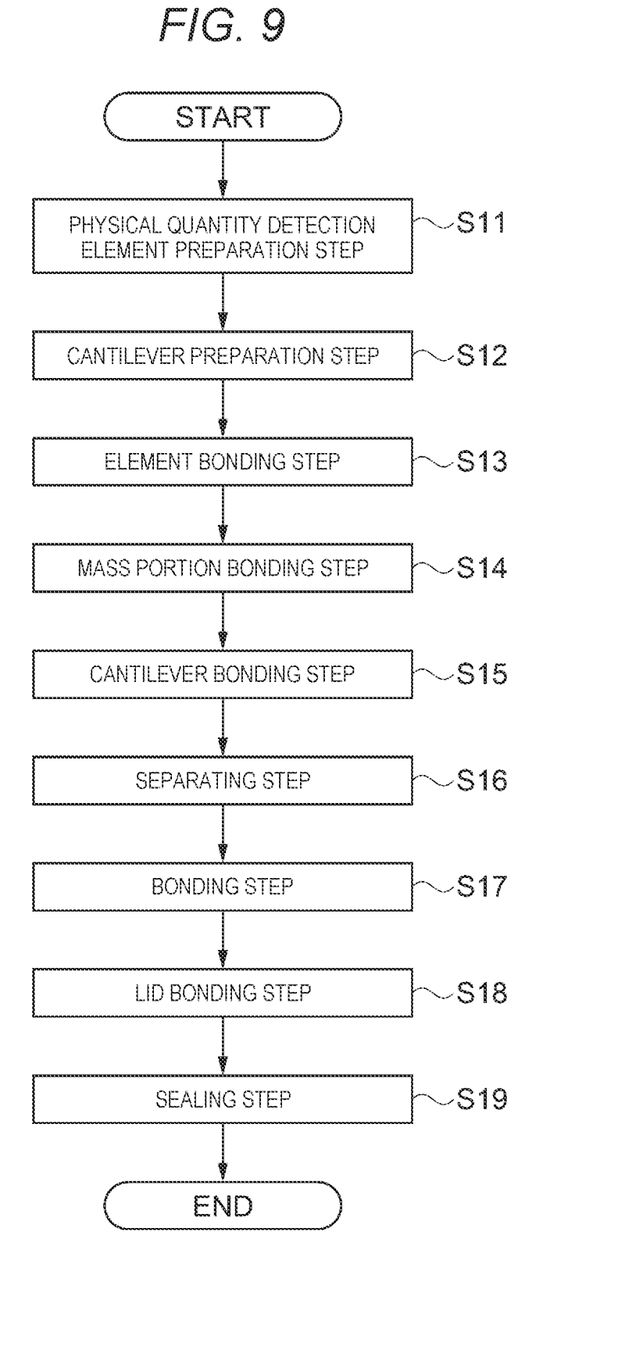
FIG. 9 is a flowchart showing a method for manufacturing a physical quantity sensor device.

As shown in FIG. 9, the method for manufacturing the physical quantity sensor device 100a according to the present embodiment includes a physical quantity detection element preparation step, a cantilever preparation step, an element bonding step, a mass portion bonding step, a cantilever bonding step, the separating step, a bonding step, a lid bonding step, and a sealing step.

In the separating step of step S16, in a state in which the physical quantity sensor 10 is mounted on the base 110, specifically, in a state in which the first fixing portion 81, the second fixing portion 82, and the third fixing portion 83 of the physical quantity sensor 10 are fixed onto the step portion 112 of the base 110, the thin portion 85 and the thin portion 86 that are formed in the second arm portion 32 are broken and removed. Through this process, the physical quantity sensor 10c in which the base portion 20 and the second fixing portion 82 coupled by the second arm portion 32 are separated from each other is obtained. Since the base portion 20 and the second fixing portion 82 are separated from each other, the stress from the package or the like generated by fixing the fixing portion 80 can be further relaxed. The separating step may be performed after the bonding step of step S17.

According to the method for manufacturing the physical quantity sensor device 100a in the present embodiment, it is possible to obtain the physical quantity sensor device 100a capable of further reducing the deterioration of the temperature characteristics and the aging characteristics.

6. Sixth Embodiment

Next, a physical quantity sensor device 100b according to a sixth embodiment will be described with reference to FIG. 10.

Figure 10:
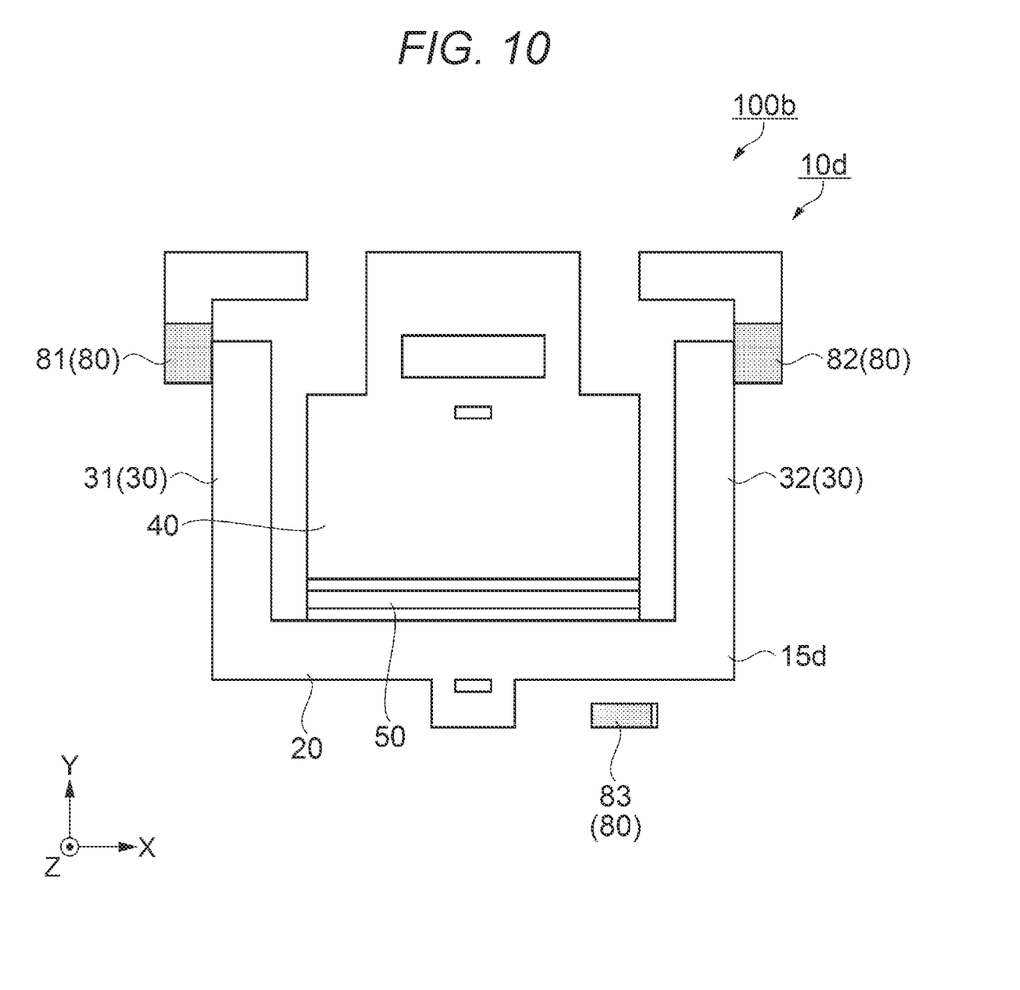
FIG. 10 is a plan view showing a schematic structure of a cantilever provided in a physical quantity sensor device according to a sixth embodiment.

FIG. 10 is a plan view showing a schematic structure of a cantilever 15d of a physical quantity sensor 10d provided in the physical quantity sensor device 100b according to the sixth embodiment.

The physical quantity sensor device 100b according to the present embodiment is similar as the physical quantity sensor device 100 according to the fourth embodiment except that the structure of the cantilever 15d of the physical quantity sensor 10d is different from that of the physical quantity sensor device 100 according to the fourth embodiment. Differences from the fourth embodiment described above will be mainly described, the same elements will be denoted by the same reference numerals, and the description thereof will be omitted.

As shown in FIG. 10, in the cantilever 15d of the physical quantity sensor 10d provided in the physical quantity sensor device 100b, the base portion 20 of the third arm portion 33 and the third fixing portion 83 are separated from each other. This state is a state in which, in the cantilever 15b of the physical quantity sensor 10b according to the third embodiment shown in FIG. 5, a portion between the thin portion 85b and the thin portion 86b formed in the third arm portion 33 is broken and removed. Therefore, the stress from the package or the like generated by fixing the fixing portion 80 can be further relaxed, and the deterioration of the temperature characteristics and the aging characteristics can be further reduced.

The method for manufacturing the physical quantity sensor device 100b is the same as the method for manufacturing the physical quantity sensor device 100a according to the fifth embodiment. In the separating step of step S16, the portion between the thin portion 85b and the thin portion 86b that are formed in the third arm portion 33 is broken and removed in a state in which the physical quantity sensor 10b is mounted at the base 110. Through this process, the physical quantity sensor 10d in which the base portion 20 and the third fixing portion 83 coupled by the third arm portion 33 are separated from each other is obtained, and the physical quantity sensor device 100b can be manufactured.

With such a configuration, it is possible to obtain similar effects as those of the physical quantity sensor device 100 according to the fourth embodiment.

Since the base portion 20 of the third arm portion 33 and the third fixing portion 83 are separated from each other, it is possible to further reduce the deterioration of the temperature characteristics and the aging characteristics.

7. Seventh Embodiment

Next, a physical quantity sensor device 200 including physical quantity sensor devices 100, 100a, and 100b according to a seventh embodiment will be described with reference to FIG. 11. In the following description, a configuration to which the physical quantity sensor device 100 including the physical quantity sensor 10 is applied will be described as an example.

The physical quantity sensor device 200 includes the three physical quantity sensor devices 100, and can detect physical quantities of three axes orthogonal to one another. The physical quantity in the physical quantity sensor device 200 according to the present embodiment is an acceleration.

Figure 11:
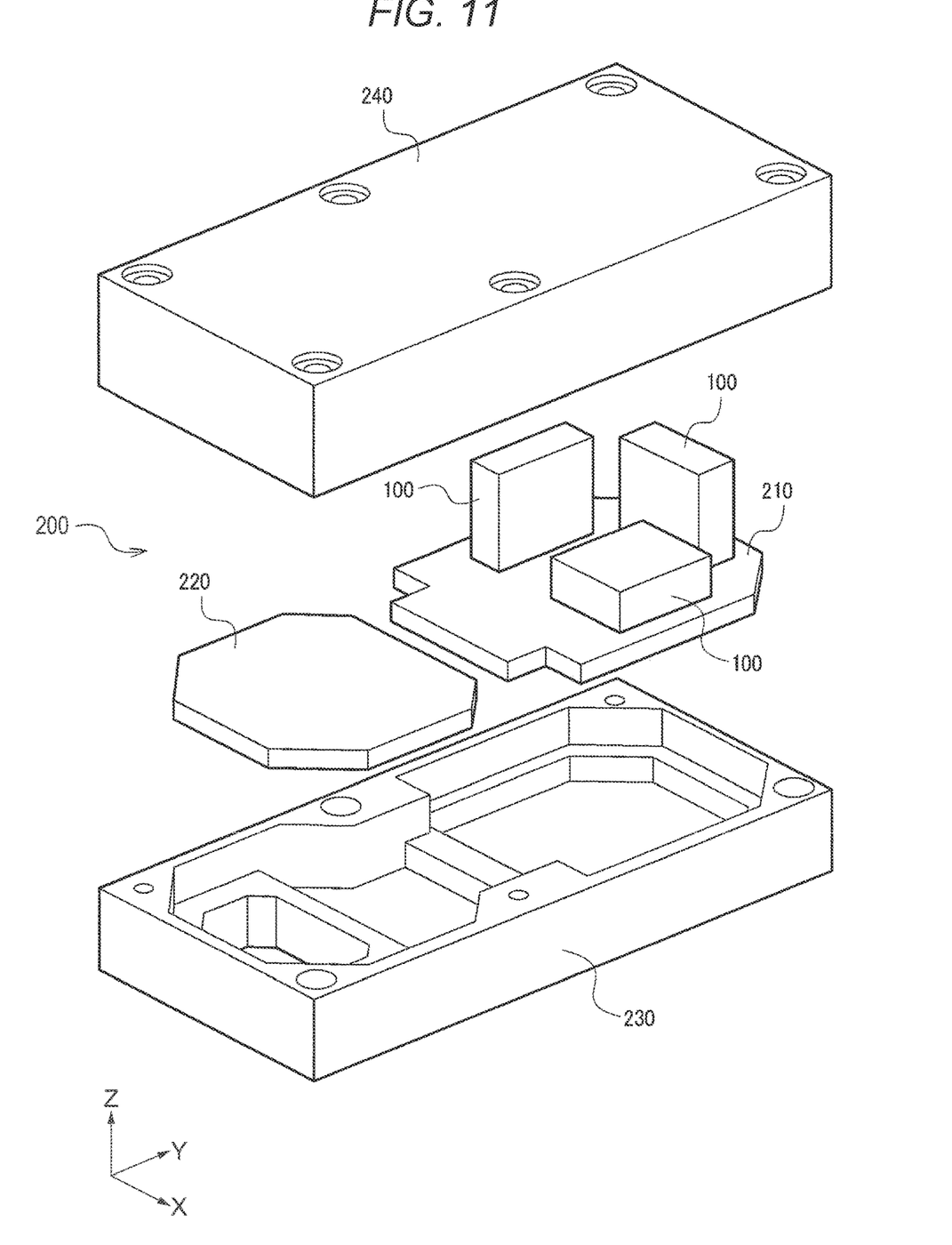
FIG. 11 is an exploded perspective view of a physical quantity sensor device according to a seventh embodiment.

As shown in FIG. 11, in the physical quantity sensor device 200, the three physical quantity sensor devices 100 are mounted at a circuit board 210. The three physical quantity sensor devices 100 are mounted at the circuit board 210 such that detection axes of the three physical quantity sensor devices 100 are respectively aligned with the three orthogonal axes. The circuit board 210 is electrically coupled to a connector board 220. The circuit board 210 and the connector board 220 are housed and held in a package formed by a package base 230 and a lid 240.

As described above, in the physical quantity sensor device 200 according to the present embodiment, the three physical quantity sensor devices 100 each including the physical quantity sensor 10 excellent in temperature characteristics and aging characteristics are mounted along the three orthogonal axes serving as the detection axes. Therefore, accelerations in three axes can be detected with high accuracy.

What is claimed is:
1. A physical quantity sensor comprising:
   a base portion;
   a first arm portion, a second arm portion, and a third arm portion that are coupled to the base portion and that are provided with fixing portions for fixing the physical quantity sensor to a base at which the physical quantity sensor is mounted;
   a movable portion disposed between the first arm portion and the second arm portion and between the first arm portion and the third arm portion in a plan view;
   a constricted portion that is disposed between the base portion and the movable portion, and that couples the base portion and the movable portion; and
   a physical quantity detection element that is disposed across the constricted portion in the plan view and that is attached to the base portion and the movable portion,
   wherein
   thin portions are formed at least at two positions between the base portion and the fixing portions in at least one of the second arm portion and the third arm portion such that the at least two positions are provided at positions other than positions in which the fixing portions are fixed to the base by an adhesive,
   the thin portions are portions thinner than other portions of the at least one of the second arm portion and the third arm portion in a thickness direction of the at least one of the second arm portion and the third arm portion, and
   when a horizontal plane is defined as a plane in an X-axis direction and Y-axis direction of the physical quantity sensor, and a Z-axis direction is a vertical direction of the physical quantity sensor orthogonal to the X-axis direction and the Y-axis direction,
   the first arm portion is coupled to one end of the base portion in the X-axis direction and extends in the Y-axis direction, the second arm portion is coupled to an opposite end of the base portion in the X-axis direction and extends in the Y-axis direction, and the third arm portion is coupled to the opposite end of the base portion and extends in the Y-axis direction, the thickness direction is the Z-axis direction.

2. A physical quantity sensor device comprising:

the physical quantity sensor including the fixing portion according to claim 1; and the base at which the physical quantity sensor is mounted, wherein the fixing portions are attached to the base.

3. The physical quantity sensor device according to claim 2, further comprising:

a circuit board, wherein the physical quantity sensor device includes three physical quantity sensors, and the three physical quantity sensors are mounted at the circuit board such that detection axes of the three physical quantity sensors are respectively aligned with three orthogonal axes.

4. The physical quantity sensor device according to claim 2, wherein a physical quantity to be detected is an acceleration.

* * * * *